United States Patent

Bahirat et al.

(10) Patent No.: US 12,430,172 B2
(45) Date of Patent: Sep. 30, 2025

(54) RESOURCE MANAGEMENT CONTROLLER

(71) Applicant: Intel Corporation, Santa Clara, CA (US)

(72) Inventors: Shirish Bahirat, Longmont, CO (US); Anand Ramalingam, Portland, OR (US); Anjaneya Reddy Chagam Reddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 17/481,940

(22) Filed: Sep. 22, 2021

(65) Prior Publication Data

US 2022/0012094 A1 Jan. 13, 2022

(51) Int. Cl.
*G06F 9/50* (2006.01)
*G06F 9/54* (2006.01)

(52) U.S. Cl.
CPC ............ *G06F 9/5005* (2013.01); *G06F 9/544* (2013.01)

(58) Field of Classification Search
CPC ...... G06F 9/5005; G06F 9/544; G06F 15/167; G06F 9/5016
See application file for complete search history.

(56) References Cited

U.S. PATENT DOCUMENTS

| | | | | |
|---|---|---|---|---|
| 6,973,521 B1 * | 12/2005 | Indiresan | ................ | G06F 9/526 710/200 |
| 2007/0005909 A1 * | 1/2007 | Cai | ...................... | G06F 12/084 711/146 |
| 2009/0132736 A1 * | 5/2009 | Hasan | .................. | G06F 13/4282 710/56 |
| 2012/0204176 A1 * | 8/2012 | Tian | ........................ | G06F 9/505 718/1 |
| 2017/0220390 A1 * | 8/2017 | Jain | ........................ | G06F 9/524 |
| 2019/0050261 A1 | 2/2019 | Schmisseur et al. | | |
| 2019/0324911 A1 * | 10/2019 | Doshi | ................ | G06F 12/0842 |
| 2020/0004685 A1 | 1/2020 | Guim Bernat et al. | | |
| 2020/0142825 A1 * | 5/2020 | Barczak | .................. | G06F 3/061 |
| 2020/0167190 A1 | 5/2020 | Guim Bernat | | |

OTHER PUBLICATIONS

Search Report and Written Opinion from Dutch Patent Application No. 2032812 notified Jul. 12, 2023, 9 pgs.

* cited by examiner

*Primary Examiner* — Wissam Rashid
(74) *Attorney, Agent, or Firm* — Essential Patents Group, LLP

(57) ABSTRACT

An embodiment of an electronic apparatus may comprise one or more substrates, and a controller coupled to the one or more substrates, the controller including circuitry to read utilization-related information for a resource from a memory shared with a processor in response to a request from the processor for the resource, and schedule utilization of the resource based at least in part on the utilization-related information for the resource. Other embodiments are disclosed and claimed.

14 Claims, 8 Drawing Sheets

RESOURCE MANAGEMENT CONTROLLER

BACKGROUND

A server or a cloud service provider (CSP) may utilize load balancer technology or scheduler technology to manage access to its resources. Load balancer technology may attempt to distribute network or application traffic across multiple servers such that traffic is directed among the servers to avoid overloading any one server. Scheduler technology may schedule processes for execution on a server. The LINUX kernel includes a Completely Fair Scheduler (CSF) to schedule tasks. Schedulers, such as CSF, may utilize a red-black (RB) tree to determine how tasks are scheduled for execution. The RB tree refers to a type of self-balancing binary search tree, where no path in the tree will ever be more than twice as long as any other. The scheduler may represent tasks in the RB tree and utilize the data structure to determine which task to run next. Each task is stored in the RB tree based on its virtual run time. The left most node in the tree corresponds to the task with the least virtual run time. Accordingly, when determining a next task to run, the scheduler picks the left most node.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
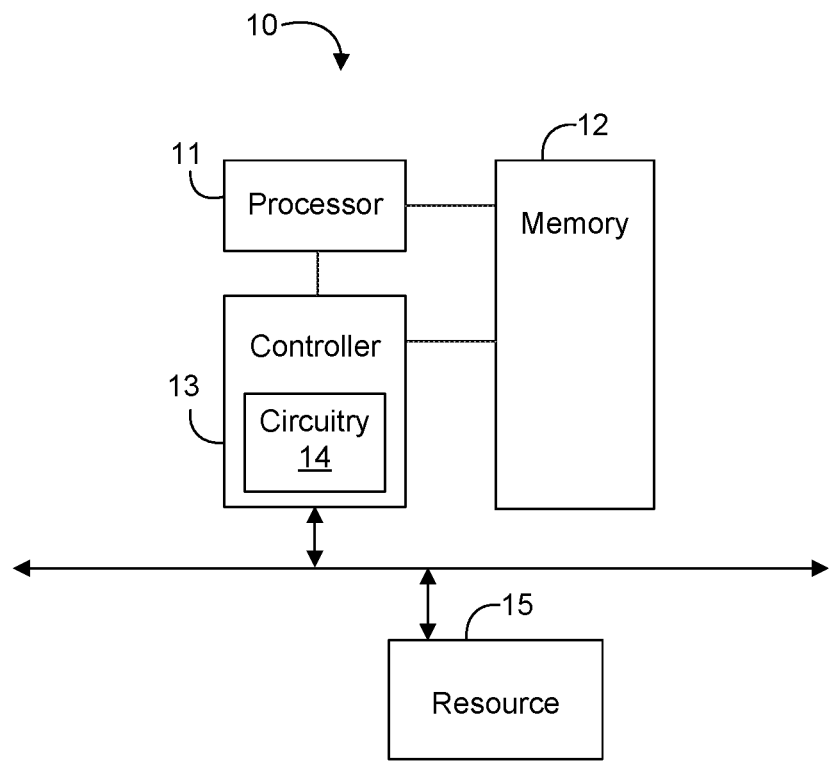
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

With reference to FIG. 1, an embodiment of an electronic system 10 may include a processor 11, memory 12 communicatively coupled to the processor 11, and a controller 13 communicatively coupled to the processor 11 and the memory 12. The controller 13 may include circuitry 14 to read utilization-related information for a resource 15 from the memory 12 in response to a request from the processor 11 for the resource 15, and schedule utilization of the resource 15 based at least in part on the utilization-related information for the resource 15. For example, the utilization-related information may include run-time telemetry for the resource 15.

In some embodiments, the circuitry 14 may be configured to schedule utilization of the resource 15 based on a priority associated with the request and the utilization-related information for the resource. Additionally, or alternatively, the circuitry 14 may be further configured to handle a page-fault in response to the request from the processor 11. In some embodiments, the circuitry 14 may also be configured to determine if the utilization of the resource 15 responsive to the request from the processor 11 is complete and, if so determined, notify the processor 11 that the request is completed.

In some embodiments, the circuitry 14 may be further configured to interface with an agent to schedule resource utilization of a remote resource. In one example, the circuitry 14 may be configured to read run-time bandwidth information from the memory 12 for two or more resources in response to the request from the processor 11, and perform an on-the-fly selection among the two or more resources based on the run-time bandwidth information. In another example, the circuitry 14 may be configured to read run-time internal resource utilization information from the memory 12 for a non-volatile memory (NVM) in response to the request from the processor 11, and schedule utilization of the NVM based on a priority associated with the request and the run-time internal resource utilization information for the NVM.

For example, the controller 13 may be configured as a resource management controller (RMC), as described in further detail herein. For example, the resource 15 may be a connected memory device (e.g., DRAM, NVM, solid-state drive (SSD), a storage node, etc.), a hardware (HW) accelerator, a compute node, or other peripheral device. The resource 15 may include a RMC agent, as described in further detail below, to store run-time utilization information in the memory 12. Embodiments of each of the above processor 11, memory 12, controller 13, circuitry 14, and other system components may be implemented in hardware, software, or any suitable combination thereof. For example, hardware implementations may include configurable logic such as, for example, programmable logic arrays (PLAs), FPGAs, complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Embodiments of the processor 11 may include a general purpose processor, a special purpose processor, a central processor unit (CPU), an execution unit, etc. Embodiments of the controller 13 may include a general purpose controller, a special purpose controller, a memory controller, a storage controller, a micro-controller, an execution unit, etc. In some embodiments, the memory 12, the controller 13, the circuitry 14, and/or other system memory may be located in, or co-located with, various components, including the processor 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, persistent storage media, or other system memory may store a set of instructions (e.g., which may be firmware instructions) which when executed by the processor 11 and/or controller 13 cause the system 10 to implement one or more components, features, or aspects of the system 10 (e.g., reading the utilization-related information from the memory 12 in response to a request from the processor 11, scheduling utilization of a resource based at least in part on the utilization-related information, etc.).

Figure 2:
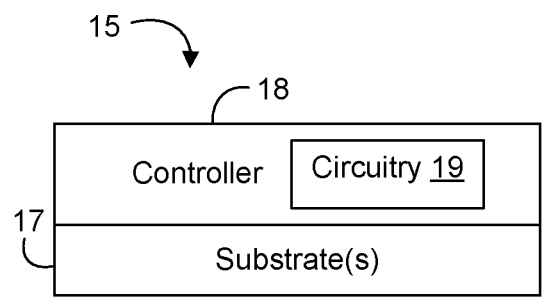
FIG. 2 is a block diagram of an example of an electronic apparatus according to an embodiment.

With reference to FIG. 2, an embodiment of an electronic apparatus 16 may include one or more substrates 17, and a controller 18 coupled to the one or more substrates 17. The controller 18 may include circuitry 19 to read utilization-related information for a resource from a memory shared with a processor in response to a request from the processor for the resource, and schedule utilization of the resource based at least in part on the utilization-related information for the resource. For example, the utilization-related information may include run-time telemetry for the resource. In some embodiments, the circuitry 19 may be configured to schedule utilization of the resource based on a priority associated with the request and the utilization-related information for the resource. Additionally, or alternatively, the circuitry 19 may be further configured to handle a page-fault in response to the request from the processor. In some embodiments, the circuitry 19 may also be configured to determine if the utilization of the resource responsive to the request from the processor is complete and, if so determined, notify the processor that the request is completed.

In some embodiments, the circuitry 19 may be further configured to interface with an agent to schedule resource utilization of a remote resource. In one example, the circuitry 19 may be configured to read run-time bandwidth information from the shared memory for two or more resources in response to the request from the processor, and perform an on-the-fly selection among the two or more resources based on the run-time bandwidth information. In another example, the circuitry 19 may be configured to read run-time internal resource utilization information from the shared memory for a NVM in response to the request from the processor, and schedule utilization of the NVM based on a priority associated with the request and the run-time internal resource utilization information for the NVM.

For example, the controller 18 may be configured as a RMC, as described in further detail herein. For example, the resource may be a connected peripheral device (e.g., DRAM, NVM, SSD, a storage node, a hardware (HW) accelerator, a compute node, etc.), and may include a RMC agent, as described in further detail below, to store run-time utilization information in the shared memory. Embodiments of the circuitry 19 may be implemented in a system, apparatus, computer, device, etc., for example, such as those described herein. More particularly, hardware implementations of the circuitry 19 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 19 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 19 may be implemented on a semiconductor apparatus, which may include the one or more substrates 17, with the circuitry 19 coupled to the one or more substrates 17. In some embodiments, the circuitry 19 may be at least partly implemented in one or more of configurable logic and fixed-functionality hardware logic on semiconductor substrate(s) (e.g., silicon, sapphire, gallium-arsenide, etc.). For example, the circuitry 19 may include a transistor array and/or other integrated circuit components coupled to the substrate(s) 17 with transistor channel regions that are positioned within the substrate(s) 17. The interface between the circuitry 19 and the substrate(s) 17 may not be an abrupt junction. The circuitry 19 may also be considered to include an epitaxial layer that is grown on an initial wafer of the substrate(s) 17.

Figure 3A:
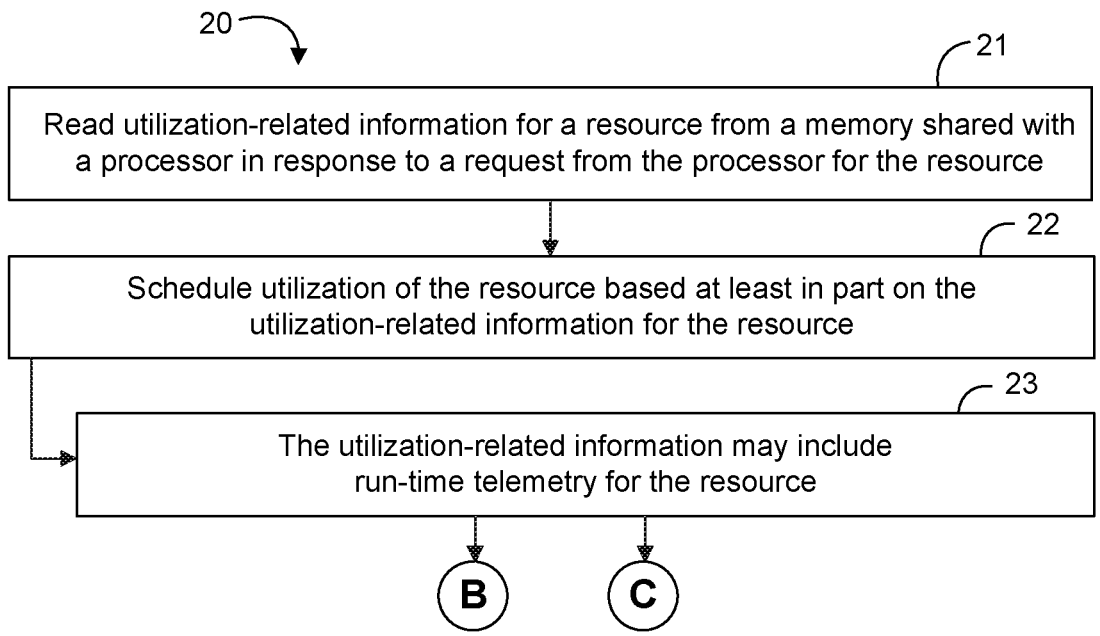
FIGS. 3A to 3C is a flowchart of an example of a method of managing a resource according to an embodiment.
Figure 3B:
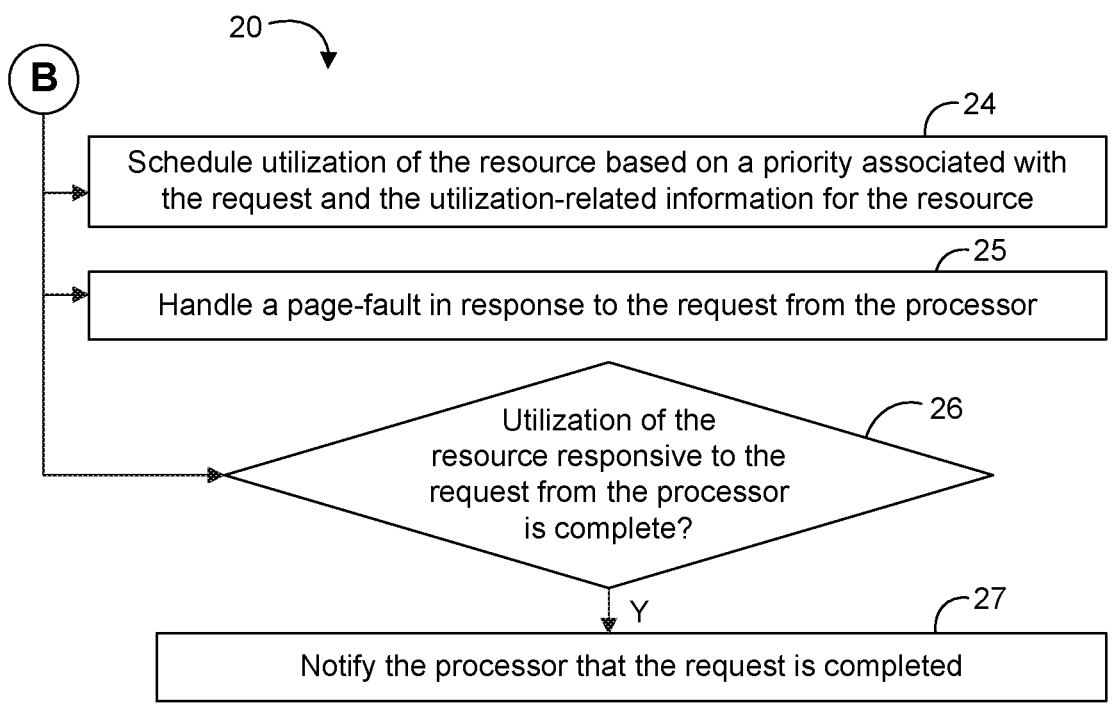
Figure 3C:
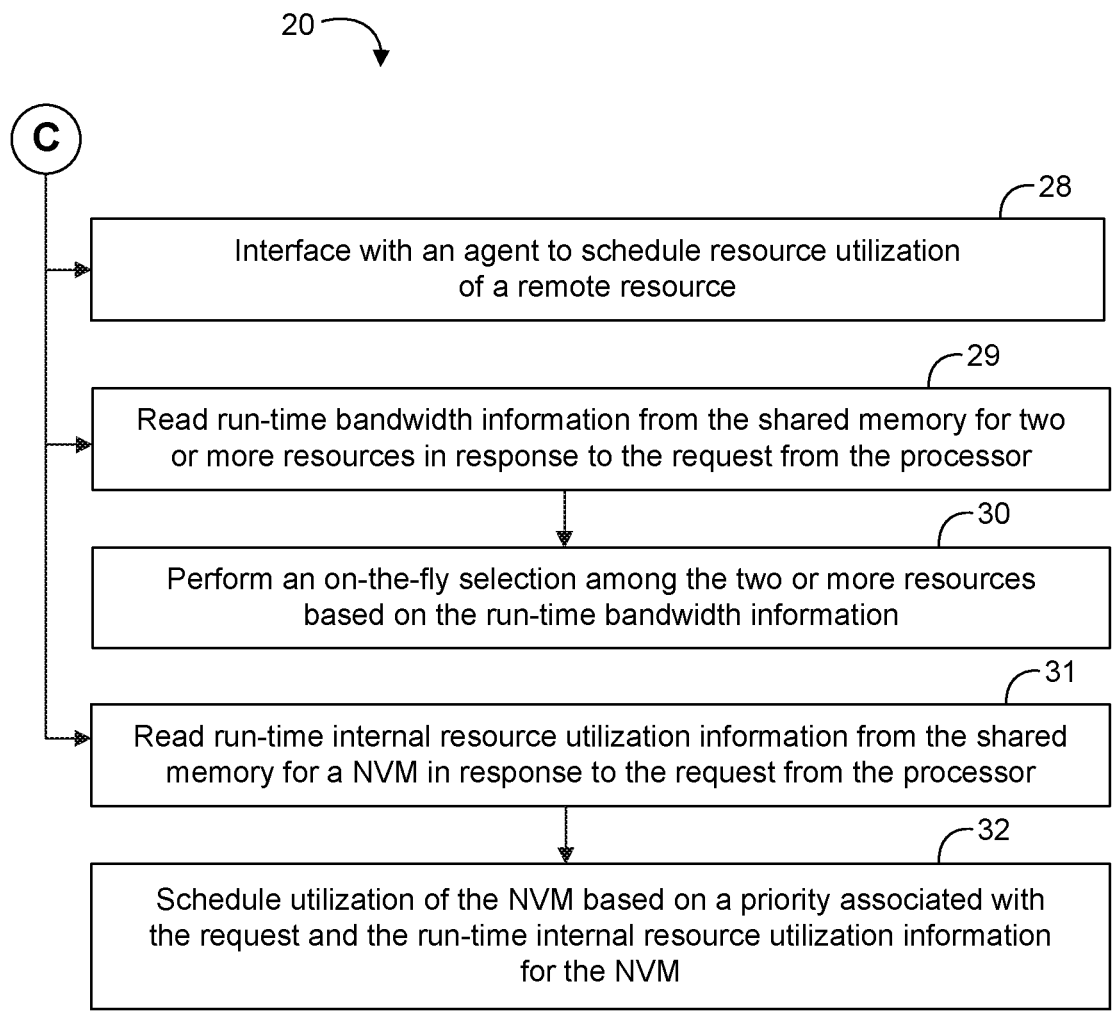

Turning now to FIGS. 3A to 3C, an embodiment of a method 20 of managing a resource may include reading utilization-related information for a resource from a memory shared with a processor in response to a request from the processor for the resource at block 21, and scheduling utilization of the resource based at least in part on the utilization-related information for the resource at block 22. For example, the utilization-related information may include run-time telemetry for the resource at block 23. Some embodiments of the method 20 may further include scheduling utilization of the resource based on a priority associated with the request and the utilization-related information for the resource at block 24, and/or handling a page-fault in response to the request from the processor at block 25. The method 20 may also include determining if the utilization of the resource responsive to the request from the processor is complete at block 26 and, if so determined, notifying the processor that the request is completed at block 27.

In some embodiments, the method 20 may further include interfacing with an agent to schedule resource utilization of a remote resource at block 28. In one example, the method 20 includes reading run-time bandwidth information from the shared memory for two or more resources in response to the request from the processor at block 29, and performing an on-the-fly selection among the two or more resources based on the run-time bandwidth information at block 30. In another example, the method 20 includes reading run-time internal resource utilization information from the shared memory for a NVM in response to the request from the processor at block 31, and scheduling utilization of the NVM based on a priority associated with the request and the run-time internal resource utilization information for the NVM at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for cluster level coordination and synchronization of various layers of the stack for improved utilization of resources. Memory cost is increasingly becoming a significant part of total cost of ownership (TCO) at data centers with more than half of capital spending sometimes attributed to SSDs. Underutilized SSD's is one of the biggest challenges in lowering costs at data center, where capital investments remain idle or unused. On the other hand, when SSD's are maximally loaded with user data then meeting the performance requirements becomes another set of challenges as more users access the same SSD and due to less spares or over provisioning result in die-to-die collisions, increasing in write amplification factor, consuming endurance, etc.

The memory tier or HW acceleration utilization by a specific application conventionally may be managed through a CFS in an operating system (OS). Application stacks can allocate a certain percentage based on virtual time that is tracked in the kernel. When the application execute, virtual time is incremented. Accordingly, IO intensive operations consume less CPU time compared to compute intensive applications. IO intensive applications get executed more frequently compared to compute intensive applications with this approach. If the budgeted virtual time is available for the application, then the application is scheduled for execution.

Conventional software technology to manage resource utilization for SSDs has many limitations because the cloud software stack does not consider the inner workings of SSD critical parameters such as die loading, read and program collisions, internal parallelism, capacity utilization, write amplification, etc. For example, conventionally the CSF does not have any visibility of actual HW resources. A problem with RB tree-based schedulers, or software schedulers in general, is that the actual utilization of memory devices, or HW accelerators and other peripherals is unknown to the scheduler. To compensate for this lack of information, conventional scheduling and resource allocation algorithms are designed with non-optimal allocation of resources, which is a major waste in hyper-scaler environment.

Also, there is no single solution such as a specific type of scheduler or load balancer that fits for use cases as many tiers in compute as well as memory need to work in conjunction for workload specific operational optimal points. Optimizations to solve this problem are not local with disaggregation and heterogenous systems and there are many dimensions to layers in configurable solution space. Embodiments may provide technology to overcome one or more of the foregoing problems. Advantageously, embodiments may improve the coordination between storage software and SSD firmware to increase or maximize flash storage performance utilization. Some embodiments may provide technology to improve cloud infrastructure resource utilization through cluster level coordination and synchronization of various layers of the stack. Advantageously, improved utilization of such resources may result in significant cost savings.

Some embodiments may provide technology for a CPU to better pair with the correct resource based on detected HW resource utilization, instead of using virtual time in RB tree to schedule CPU tasks. Some embodiments may be more holistic and scalable across many dimensions, and may go beyond a conventional scheduler virtual time management based approach.

Figure 4:
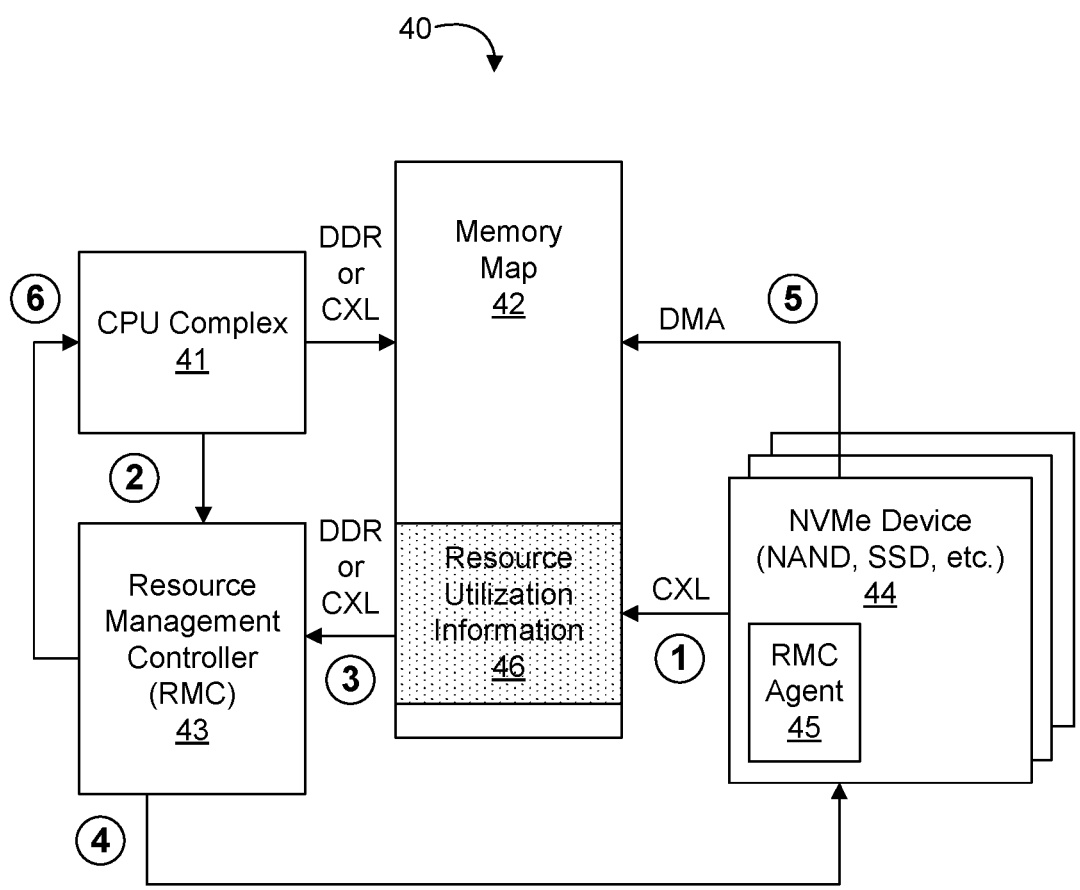
FIG. 4 is a block diagram of an example of a compute environment according to an embodiment.

With reference to FIG. 4, an embodiment of a compute environment 40 includes a CPU complex 41 (e.g., with 32, 64, or more cores) coupled to a memory map 42 (e.g., via a DDR or Compute Express Link (CXL) interface). The CPU complex is further coupled to a RMC 43, where the RMC 43 is also coupled to the same memory map 42 (e.g., memory space is shared between the CPU 41 and the RMC 43). One or more peripheral devices (e.g., a NVM Express (NVMe) device 44 such as a NAND memory device, a SSD device, etc.) are coupled to the RMC 43 and the memory map 42 (e.g., via CXL and direct memory access (DMA) as shown). Each device 44 includes a RMC agent 45 that stores run-time telemetry in the memory map 42. For example, the memory map 42 may include a reserved location for resource utilization information 46. The RMC 43 then reads the resource utilization information 46 in response to a request from the CPU 41 and uses the information to make decision for resource management.

In a conventional environment, a CPU manages the block device IO upon a page fault through the NVMe protocol and when a command is issued the kernel task scheduler executes the task as a function of the RB tree-based scheduler. In the environment 40, as shown in FIG. 4, for local resource management the RMC 43 accesses the same memory map 42 shared by the CPU complex 42 through DDR or a CXL.mem bus. At point 1 (indicated by the circled number 1 in FIG. 4), run-time telemetry is provided from the peripheral devices to the shared memory map 42 by the respective agents 45. When any CPU gets a page fault (e.g., at point 2), instead of managing file input/output (IO), the CPU hands over the control to the RMC 43 to decide next steps. Within same shared memory map 42, the RMC 43 tracks the resource utilization information 46 that includes details such as, for example, number of inflight commands in the NVMe device 44, number of outstanding commands in queue, die loading and internal resource availability within each NVMe device 44, etc. When the RMC 43 gets the request to handle the page fault from the CPU, the RMC 43 reads the run-time resource utilization information 46 from the shared memory map 42 (e.g., at point 3). Depending on the application IO priority, the RMC 43 makes better or optimal decisions (e.g., at point 4) for command scheduling priority. For example, the RMC 43 may decide to issue writes to a specific device or prioritize reads based on the run-time resource utilization information 46 from the shared memory map 42 (e.g., device actual available bandwidth, etc.). After the command is executed and DMA transfer to main memory is complete (e.g., at point 5), the RMC 43 also polls for command completion and notifies the CPU about the operation completion (e.g., at point 6).

Figure 5:
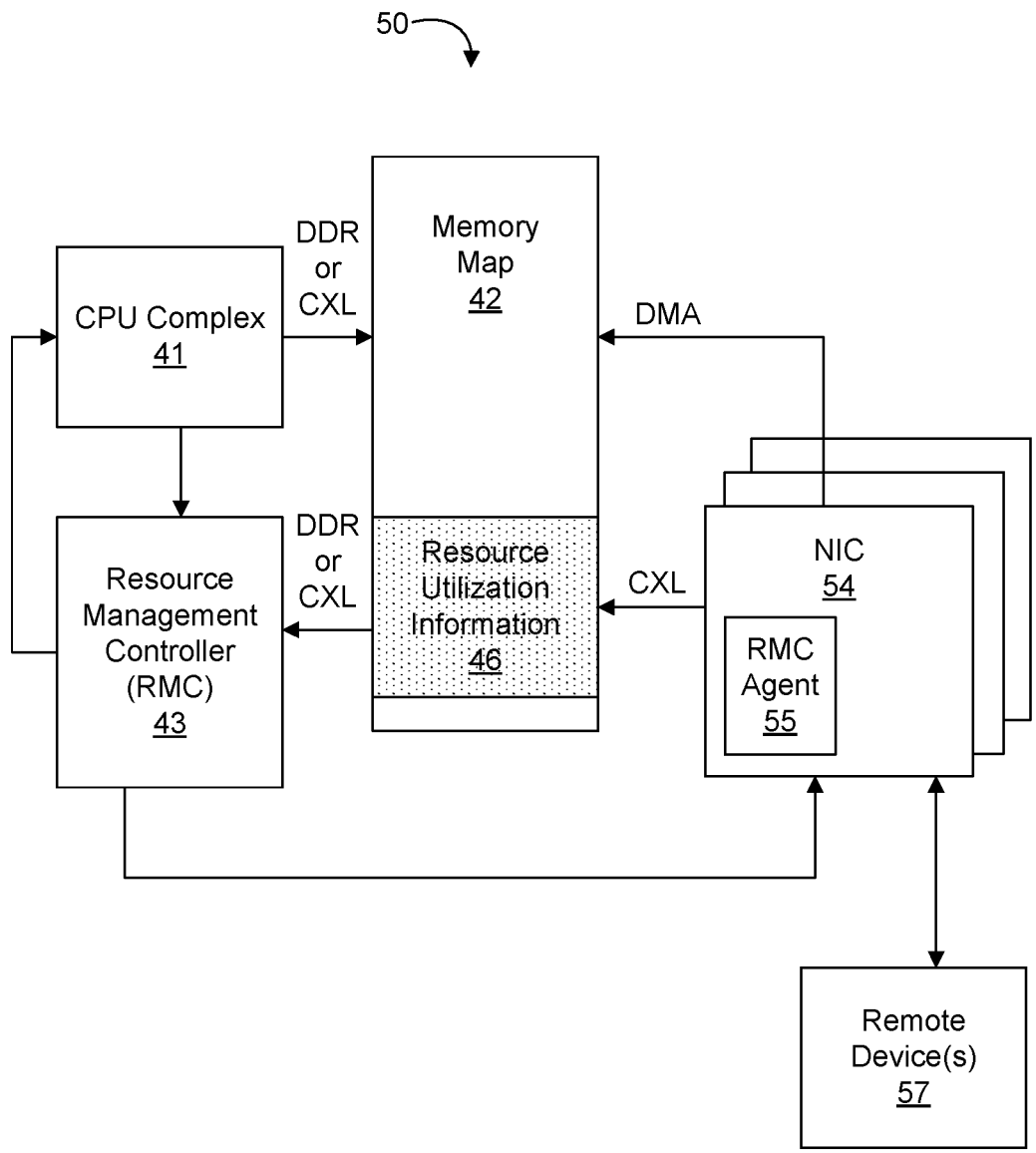
FIG. 5 is a block diagram of another example of a compute environment according to an embodiment.

With reference to FIG. 5, an embodiment of a compute environment 50 may be similarly configured as the environment 40, with like reference numerals indicating similar components. The environment 50 may further include a network interface component (NIC) 54 as one of the peripheral devices. The NIC 54 includes a RMC agent 55 to store telemetry information from one or more remote device(s) 57 as part of the resource utilization information 46. For remote resource management, the RMC 43 interfaces with the NIC 54, instead of the local NVMe devices 44.

Figure 6:
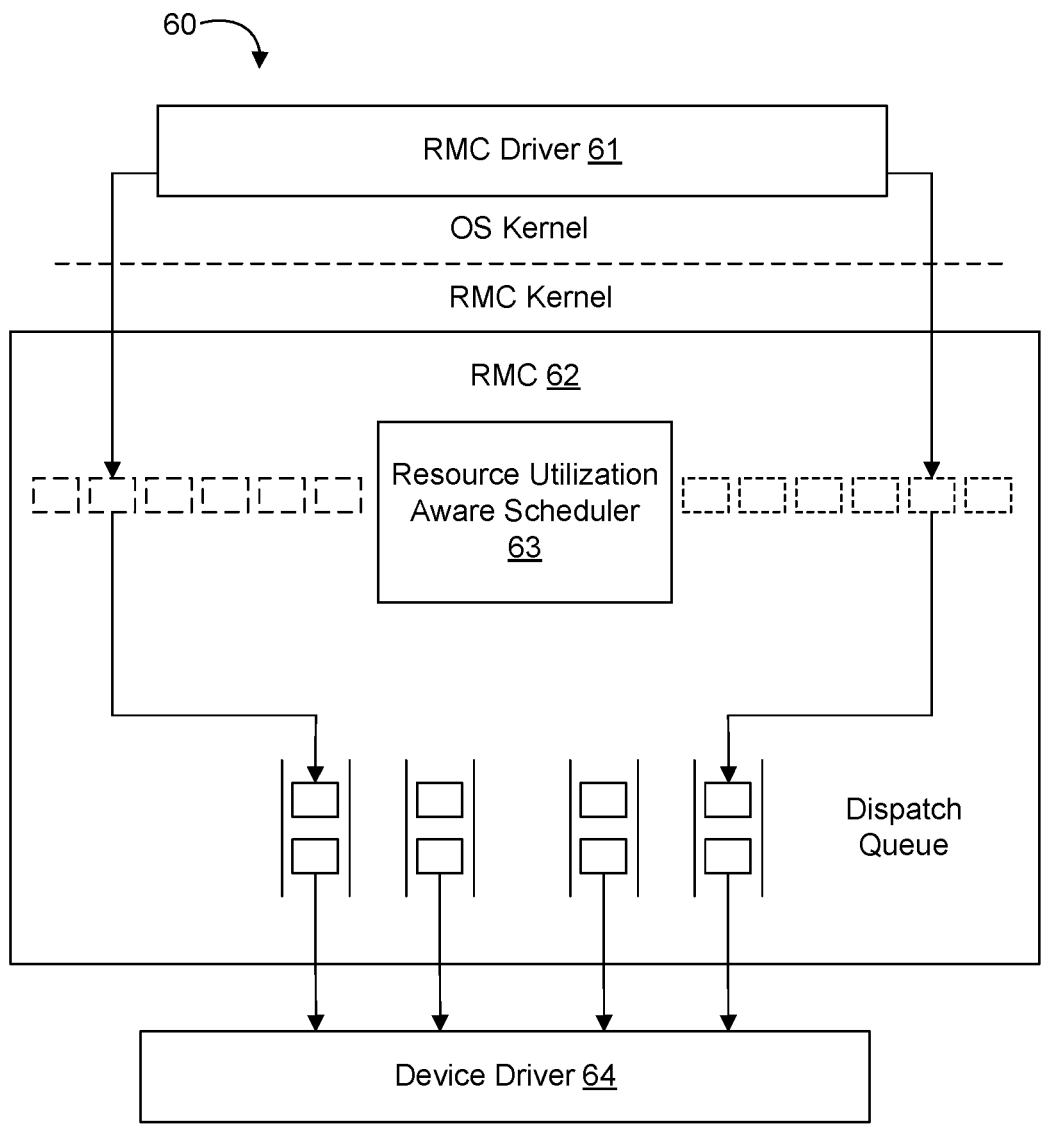
FIG. 6 is a block diagram of another example of a compute environment according to an embodiment.

With reference to FIG. 6, an embodiment of a compute environment 60 includes more detail on a kernel handoff from a RMC driver 61 on the OS kernel side to a RMC 62 on the RMC kernel side. Requests from the RMC driver 61 are held in a request queue in the RMC 62 for scheduling by a resource utilization aware scheduler 63. The RMC scheduler 63 resource allocations are performed using following example parameters: performance (e.g., quality of service (QoS), latency, bandwidth profiles, etc.); reliability (e.g., blast radius, fault containment, error recovery and detection, etc.); power (e.g., additional components, increased data transfers, etc.); efficient resource management (e.g., allocation policies, bin packing, etc.); and/or cost (e.g., system configuration, component switching, etc.). The RMC 62 manages the following example aspects: on the fly selection (e.g., memory tier, compute resource, etc.); on the fly power management—Low, Mid, High Power Modes, DVS, DFS, etc.); on the fly configuration (e.g., QLC, ELC, SLC, compute location (e.g., accelerator, memory, GPU, etc.), CPU frequency, network radix, etc.); on the fly IO type utilization (e.g., memory, cache, storage, CPU, etc.); and/or on the fly resource selection (e.g., number of cores, number of memory and storage banks, number of accelerators, etc.). The RMC 62 reads resource utilization information from a shared memory and decides when to move a request from the request queue to the dispatch queue, from where the request gets handed off to a device driver 64.

In some embodiments, the RMC 62 may use the foregoing parameters (e.g., provided from a SSD in a cloud service provider (CSP)'s environment) to achieve QLC NAND equivalent or better performance in terms of QoS, bandwidth and IOPs as compared to TLC NAND. A conventional scheduler does not consider actual resource utilization of devices such as NVMe devices (e.g., where actual resource utilization may vary based on media operation times, bus utilizations, die collisions, data transfer collisions, media read retries, internal resource utilization such as buffer utilization, etc.) with parameters that cannot be simply abstracted accurately. To compensate for lack of information, the conventional scheduler may underutilize resources by design. In contrast, some embodiments of the RMC 62 may track actual utilization of peripheral devices. Considering the actual utilization during scheduling, some embodiments improve or optimizes the system in much better fashion thus reduces or eliminates the overallocation of these resources. Also, the RMC 62 may be used in much more flexible ways as compared to a conventional scheduler. In some embodiments, functional parameters and thresholds may be configured through a host software stack.

Figure 7:
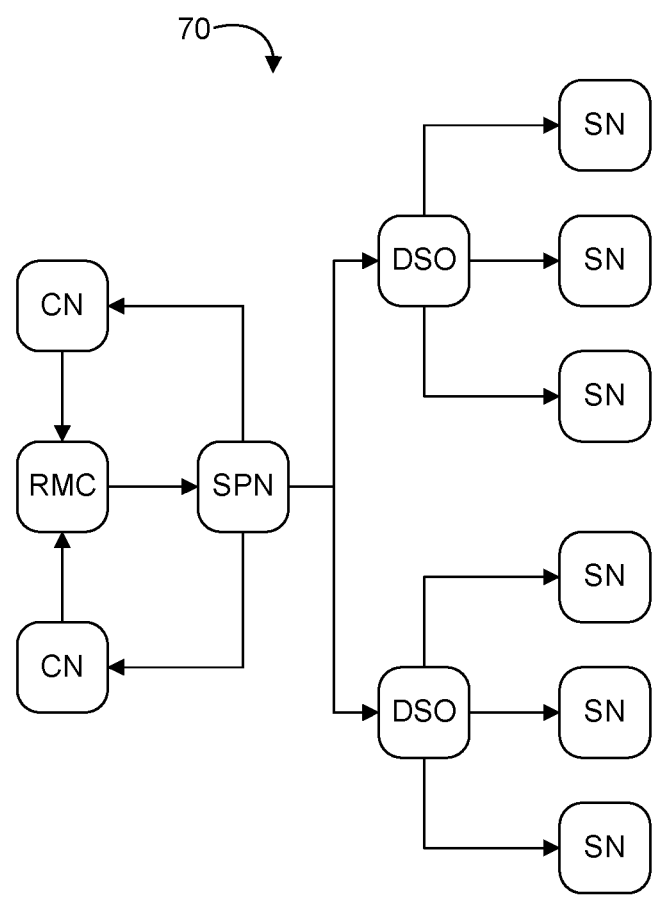
FIG. 7 is a block diagram of an example of a compute cluster according to an embodiment.

With reference to FIG. 7, an embodiment of a compute cluster 70 may include two or more compute nodes (CN) coupled to a RMC. The RMC may be further coupled to a storage primary node (SPN). The CNs may be coupled to the SPN which may utilize remote distributed storage for increased storage capacity and/or large data storage. Access to the SPN from the CNs may generally go through the RMC such that the RMC may efficiently manage the resources connected to the SPN. One or more distributed storage orchestrators (DSOs) may be coupled to the SPN. One or more storage cluster nodes (SNs) are connected to the SPN through each DSO.

Table 1 shows examples of the management actions driven by the RMC as the observes resource utilization including CPU and IO operations for applications. For a database query, for example, a conventional recommendation may be to transition the application to in memory compute. The RMC may read actual utilization information, however, and if the SSD is not busy and the CPU is underutilized, then enforcing offloading of the compute to memory may not yield the performance gains where there might be other application in greater need to utilize in memory compute. These and other trade-offs are managed through the RMC based on more accurate decisions than might be made by conventional scheduler frameworks.

TABLE 1

| Control Actions | RMC driven decision | Result |
|---|---|---|
| In memory compute offload | Minimize bus transactions | Reduce IO latency |
| Cache data for HW accelerator | Minimize IO access | Reduce IO latency |
| Allocate more CPUs | Eliminate bottleneck | Compute optimization |
| Transfer data to SCM | Reduce WA for SSD | Improved endurance |
| Transition to lower power mode | Lower power consumption | Cost and thermal improvement |
| Device priority change | Optimize task scheduling | Higher utilization |
| Execute controller cleanup | Initiate device controlled defrag | Host BW and IOPs improvement |
| Non-competing containers | Schedule at same time | Power and TCO saving |
| Switch memory time | QLC or MLC media | Performance optimization |

Advantageously, embodiments of a RMC may balance the system strengths with substantial improvement in QoS and significant utilization improvements in capacity.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
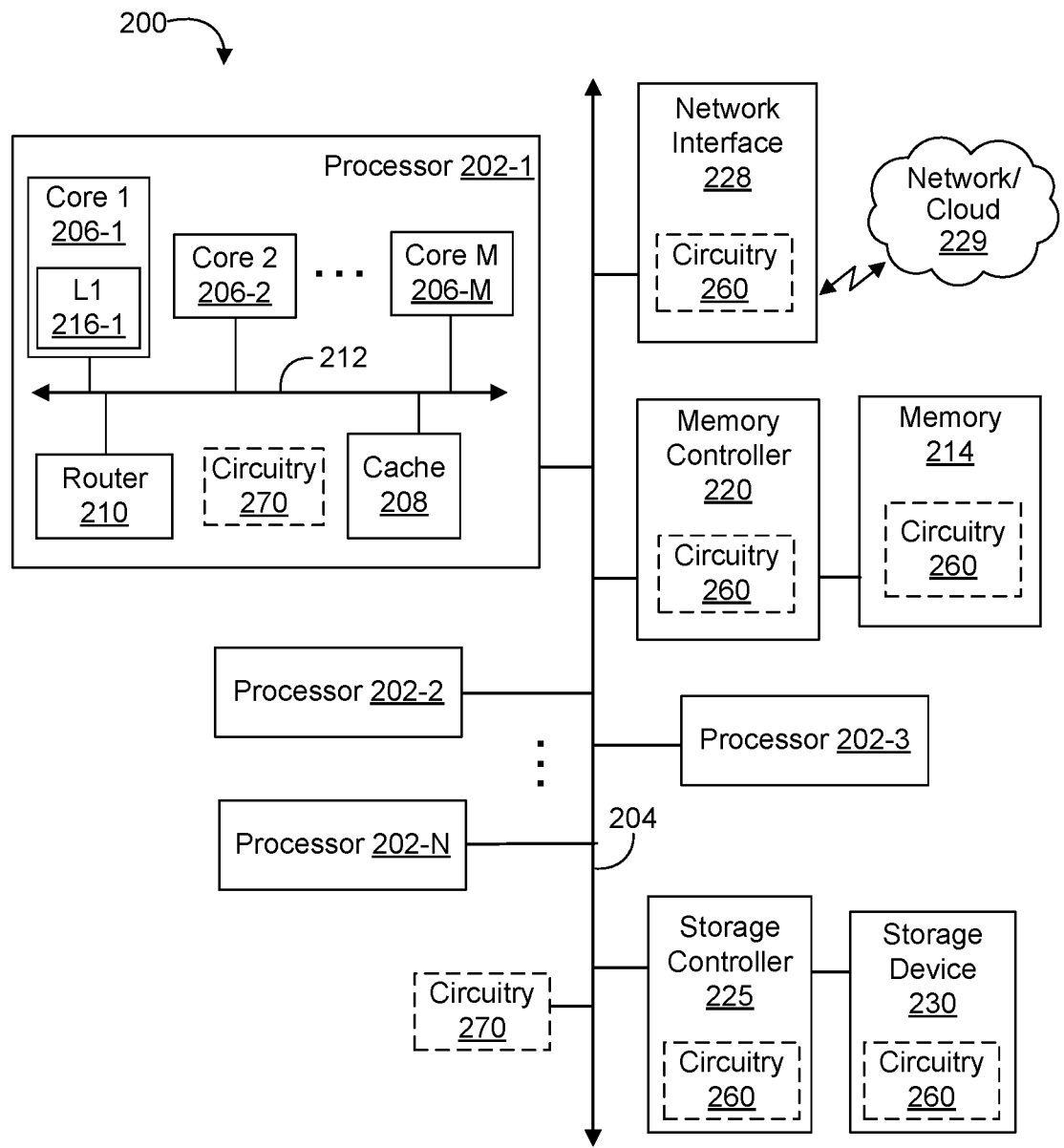
FIG. 8 is a block diagram of an example of a computing system according to an embodiment.

Turning now to FIG. 8, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), circuitry 270, memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 8, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 8, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 8, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, circuitry 270, etc., to sense variations in various factors affecting power/thermal behavior of the system/platform, such as temperature, operating frequency, operating voltage, power consumption, and/or inter-core communication activity, etc.

As shown in FIG. 8, features or aspects of the circuitry 260 and circuitry 270 may be distributed throughout the system 200, and/or co-located/integrated with various components of the system 200. Any aspect of the system 200 that may require or benefit from RMC technology may include the circuitry 260 and/or the circuitry 270. For example, the memory 214, the memory controller 220, the storage controller 225, and the network interface 228 may each include circuitry 260, while the processor(s) 202 may include the circuitry 270, which may be in the same enclosure as the system 200 and/or fully integrated on a printed circuit board (PCB) of the system 200. For example, the circuitry 270 may be configured to implement the RMC aspects of the various embodiments, while the circuitry 260 may be configured to implement the RMC agent aspects of the various embodiments. For example, the respective circuitry 260 may be configured to store resource utilization information for the respective peripheral devices in the memory 214.

Advantageously, the circuitry 260 and the circuitry 270 may include technology to implement one or more aspects of the system 10 (FIG. 1), the apparatus 16 (FIG. 2), the method 20 (FIGS. 3A to 3C), the environment 40 (FIG. 4), the environment 50 (FIG. 5), the environment 60 (FIG. 6), the cluster 70 (FIG. 7), and/or any of the RMC features discussed herein. The system 200 may include further circuitry 260, 270 and located outside of the foregoing components.

In some embodiments, the circuitry 270 may be configured to read utilization-related information for a peripheral device (e.g., the storage device 230, the network interface 228) from the memory 214 in response to a request from the processor(s) 202 for the peripheral device, and schedule utilization of the peripheral device based at least in part on the utilization-related information for the peripheral device. For example, the utilization-related information may include run-time telemetry for the peripheral device. In some embodiments, the circuitry 270 may be configured to schedule utilization of the peripheral device based on a priority associated with the request and the utilization-related information for the resource. Additionally, or alternatively, the circuitry 270 may be further configured to handle a page-fault in response to the request from the processor(s) 202. In some embodiments, the circuitry 270 may also be configured to determine if the utilization of the peripheral device responsive to the request from the processor(s) 202 is complete and, if so determined, notify the processor(s) 202 that the request is completed.

In some embodiments, the circuitry 270 may be further configured to interface with the network interface 214 to schedule resource utilization of a remote resource. In one example, the circuitry 270 may be configured to read run-time bandwidth information from the memory 214 for two or more resources in response to the request from the processor(s) 202, and perform an on-the-fly selection among the two or more resources based on the run-time bandwidth information. In another example, the circuitry 270 may be configured to read run-time internal resource utilization information from the memory 214 for a storage device 230 in response to the request from the processor(s) 202, and schedule utilization of the storage device 230 based on a priority associated with the request and the run-time internal resource utilization information for the storage device 230.

ADDITIONAL NOTES AND EXAMPLES

Example 1 includes an electronic apparatus, comprising one or more substrates, and a controller coupled to the one or more substrates, the controller including circuitry to read utilization-related information for a resource from a memory shared with a processor in response to a request from the processor for the resource, and schedule utilization of the resource based at least in part on the utilization-related information for the resource.

Example 2 includes the apparatus of Example 1, wherein the utilization-related information includes run-time telemetry for the resource.

Example 3 includes the apparatus of any of Examples 1 to 2, wherein the circuitry is further to schedule utilization of the resource based on a priority associated with the request and the utilization-related information for the resource.

Example 4 includes the apparatus of any of Examples 1 to 3, wherein the circuitry is further to handle a page-fault in response to the request from the processor.

Example 5 includes the apparatus of any of Examples 1 to 4, wherein the circuitry is further to determine if the utilization of the resource responsive to the request from the processor is complete, and, if so determined, notify the processor that the request is completed.

Example 6 includes the apparatus of any of Examples 1 to 5, wherein the circuitry is further to interface with an agent to schedule resource utilization of a remote resource.

Example 7 includes the apparatus of any of Examples 1 to 6, wherein the circuitry is further to read run-time bandwidth information from the shared memory for two or more resources in response to the request from the processor, and perform an on-the-fly selection among the two or more resources based on the run-time bandwidth information.

Example 8 includes the apparatus of any of Examples 1 to 7, wherein the circuitry is further to read run-time internal resource utilization information from the shared memory for a non-volatile memory in response to the request from the processor, and schedule utilization of the non-volatile memory based on a priority associated with the request and the run-time internal resource utilization information for the non-volatile memory.

Example 9 includes an electronic system, comprising a processor, memory communicatively coupled to the processor, and a controller communicatively coupled to the processor and the memory, the controller including circuitry to read utilization-related information for a resource from the memory in response to a request from the processor for the resource, and schedule utilization of the resource based at least in part on the utilization-related information for the resource.

Example 10 includes the system of Example 9, wherein the utilization-related information includes run-time telemetry for the resource.

Example 11 includes the system of any of Examples 9 to 10, wherein the circuitry is further to schedule utilization of the resource based on a priority associated with the request and the utilization-related information for the resource.

Example 12 includes the system of any of Examples 9 to 11, wherein the circuitry is further to handle a page-fault in response to the request from the processor.

Example 13 includes the system of any of Examples 9 to 12, wherein the circuitry is further to determine if the utilization of the resource responsive to the request from the processor is complete, and, if so determined, notify the processor that the request is completed.

Example 14 includes the system of any of Examples 9 to 13, wherein the circuitry is further to interface with an agent to schedule resource utilization of a remote resource.

Example 15 includes the system of any of Examples 9 to 14, wherein the circuitry is further to read run-time bandwidth information from the memory for two or more resources in response to the request from the processor, and perform an on-the-fly selection among the two or more resources based on the run-time bandwidth information.

Example 16 includes the system of any of Examples 9 to 15, wherein the circuitry is further to read run-time internal resource utilization information from the memory for a non-volatile memory in response to the request from the processor, and schedule utilization of the non-volatile memory based on a priority associated with the request and the run-time internal resource utilization information for the non-volatile memory.

Example 17 includes a method of managing a resource, comprising reading utilization-related information for a resource from a memory shared with a processor in response to a request from the processor for the resource, and scheduling utilization of the resource based at least in part on the utilization-related information for the resource.

Example 18 includes the method of Example 17, wherein the utilization-related information includes run-time telemetry for the resource.

Example 19 includes the method of any of Examples 17 to 18, further comprising scheduling utilization of the resource based on a priority associated with the request and the utilization-related information for the resource.

Example 20 includes the method of any of Examples 17 to 19, further comprising handling a page-fault in response to the request from the processor.

Example 21 includes the method of any of Examples 17 to 20, further comprising determining if the utilization of the resource responsive to the request from the processor is complete, and, if so determined, notifying the processor that the request is completed.

Example 22 includes the method of any of Examples 17 to 21, further comprising interfacing with an agent to schedule resource utilization of a remote resource.

Example 23 includes the method of any of Examples 17 to 22, further comprising reading run-time bandwidth information from the shared memory for two or more resources in response to the request from the processor, and performing an on-the-fly selection among the two or more resources based on the run-time bandwidth information.

Example 24 includes the method of any of Examples 17 to 23, further comprising reading run-time internal resource utilization information from the shared memory for a non-volatile memory in response to the request from the processor, and scheduling utilization of the non-volatile memory based on a priority associated with the request and the run-time internal resource utilization information for the non-volatile memory.

Example 25 includes at least one non-transitory machine readable medium comprising a plurality of instructions that, in response to being executed on a computing device, cause the computing device to read utilization-related information for a resource from a memory shared with a processor in response to a request from the processor for the resource, and schedule utilization of the resource based at least in part on the utilization-related information for the resource.

Example 26 includes the at least one non-transitory machine readable medium of Example 25, wherein the utilization-related information includes run-time telemetry for the resource.

Example 27 includes the at least one non-transitory machine readable medium of any of Examples 25 to 26, comprising a plurality of further instructions that, in response to being executed on the computing device, cause the computing device to schedule utilization of the resource based on a priority associated with the request and the utilization-related information for the resource.

Example 28 includes the at least one non-transitory machine readable medium of any of Examples 25 to 27, comprising a plurality of further instructions that, in response to being executed on the computing device, cause the computing device to handle a page-fault in response to the request from the processor.

Example 29 includes the at least one non-transitory machine readable medium of any of Examples 25 to 28, comprising a plurality of further instructions that, in response to being executed on the computing device, cause the computing device to determine if the utilization of the resource responsive to the request from the processor is complete, and, if so determined, notify the processor that the request is completed.

Example 30 includes the at least one non-transitory machine readable medium of any of Examples 25 to 29, comprising a plurality of further instructions that, in response to being executed on the computing device, cause the computing device to interface with an agent to schedule resource utilization of a remote resource.

Example 31 includes the at least one non-transitory machine readable medium of any of Examples 25 to 30, comprising a plurality of further instructions that, in response to being executed on the computing device, cause the computing device to read run-time bandwidth information from the shared memory for two or more resources in response to the request from the processor, and perform an on-the-fly selection among the two or more resources based on the run-time bandwidth information.

Example 32 includes the at least one non-transitory machine readable medium of any of Examples 25 to 31, comprising a plurality of further instructions that, in response to being executed on the computing device, cause the computing device to read run-time internal resource utilization information from the shared memory for a non-volatile memory in response to the request from the processor, and schedule utilization of the non-volatile memory based on a priority associated with the request and the run-time internal resource utilization information for the non-volatile memory.

Example 33 includes a resource management apparatus, comprising means for reading utilization-related information for a resource from a memory shared with a processor in response to a request from the processor for the resource, and means for scheduling utilization of the resource based at least in part on the utilization-related information for the resource.

Example 34 includes the apparatus of Example 33, wherein the utilization-related information includes run-time telemetry for the resource.

Example 35 includes the apparatus of any of Examples 33 to 34, further comprising means for scheduling utilization of the resource based on a priority associated with the request and the utilization-related information for the resource.

Example 36 includes the apparatus of any of Examples 33 to 35, further comprising means for handling a page-fault in response to the request from the processor.

Example 37 includes the apparatus of any of Examples 33 to 36, further comprising means for determining if the utilization of the resource responsive to the request from the processor is complete, and, if so determined, means for notifying the processor that the request is completed.

Example 38 includes the apparatus of any of Examples 33 to 37, further comprising means for interfacing with an agent to schedule resource utilization of a remote resource.

Example 39 includes the apparatus of any of Examples 33 to 38, further comprising means for reading run-time bandwidth information from the shared memory for two or more resources in response to the request from the processor, and means for performing an on-the-fly selection among the two or more resources based on the run-time bandwidth information.

Example 40 includes the apparatus of any of Examples 33 to 39, further comprising means for reading run-time internal resource utilization information from the shared memory for a non-volatile memory in response to the request from the processor, and means for scheduling utilization of the non-volatile memory based on a priority associated with the request and the run-time internal resource utilization information for the non-volatile memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   a controller coupled to the one or more substrates, the controller including circuitry to:
   receive, from a processor, a request to handle a page fault;
   based on the request, read utilization-related information for a resource from a memory which is to be shared by the circuitry and the processor, wherein the utilization-related information is to comprise run-time telemetry for the resource, and wherein the memory is further to provide memory map information; and
   issue a command, to a dispatch queue, to schedule a utilization of the resource based on each of the utilization-related information for the resource and a first priority of an application to be executed with the processor.

2. The electronic apparatus of claim 1, wherein the circuitry is further to:
   schedule utilization of the resource based on a second priority associated with the request and the utilization-related information for the resource.

3. The electronic apparatus of claim 1, wherein the circuitry is further to:
   determine if the utilization of the resource responsive to the request from the processor is complete; and, if so determined,
   notify the processor that the request is completed.

4. The electronic apparatus of claim 1, wherein the circuitry is further to:
   interface with an agent to schedule resource utilization of a remote resource.

5. The electronic apparatus of claim 1, wherein the circuitry is further to:
   read run-time bandwidth information from the memory for two or more resources in response to the request from the processor; and
   perform an on-the-fly selection among the two or more resources based on the run-time bandwidth information.

6. The electronic apparatus of claim 1, wherein the circuitry is further to:
   read run-time internal resource utilization information from the memory for a non-volatile memory in response to the request from the processor; and
   schedule utilization of the non-volatile memory based on a second priority associated with the request and the run-time internal resource utilization information for the non-volatile memory.

7. An electronic system, comprising:
   a processor;
   memory communicatively coupled to the processor; and
   a controller communicatively coupled to the processor and the memory, the controller including circuitry to:
   receive, from the processor, a request to handle a page fault;
   based on the request, read utilization-related information for a resource from the memory, wherein the memory is to be shared by the circuitry and the processor, wherein the utilization-related information is to comprise run-time telemetry for the resource, and wherein the memory is further to provide memory map information; and issue a command, to a dispatch queue, to schedule a utilization of the resource based on each of the utilization-related information for the resource and a first priority of an application to be executed with the processor.

8. The electronic system of claim 7, wherein the circuitry is further to:
schedule utilization of the resource based on a second priority associated with the request and the utilization-related information for the resource.

9. The electronic system of claim 7, wherein the circuitry is further to:
interface with an agent to schedule resource utilization of a remote resource.

10. The electronic system of claim 7, wherein the circuitry is further to:
read run-time internal resource utilization information from the memory for a non-volatile memory in response to the request from the processor; and
schedule utilization of the non-volatile memory based on a second priority associated with the request and the run-time internal resource utilization information for the non-volatile memory.

11. A method at a controller, the method comprising:
receiving, from a processor, a request to handle a page fault;
based on the request, reading utilization-related information for a resource from a memory which is to be shared by the controller and the processor, wherein the utilization-related information comprises run-time telemetry for the resource, and wherein the memory further provides memory map information; and
issuing a command, to a dispatch queue, to schedule a utilization of the resource based on each of the utilization-related information for the resource and a first priority of an application executed with the processor.

12. The method of claim 11, further comprising:
scheduling utilization of the resource based on a second priority associated with the request and the utilization-related information for the resource.

13. The method of claim 11, further comprising:
interfacing with an agent to schedule resource utilization of a remote resource.

14. The method of claim 11, further comprising:
reading run-time bandwidth information from the memory for two or more resources in response to the request from the processor; and
performing an on-the-fly selection among the two or more resources based on the run-time bandwidth information.

* * * * *